Nov. 24, 1970  R. FRIEDL ET AL  3,543,149
TESTING ARRANGEMENT FOR ELECTRICITY METERS WHILE IN A
POWERLINE CIRCUIT BY APPLICATION OF A REGULATED LOAD
Filed Feb. 7, 1968  3 Sheets-Sheet 1

Richard Fried INVENTORS
Peter Seyfried
BY
Michael S. Striker
Attorney

United States Patent Office 3,543,149
Patented Nov. 24, 1970

3,543,149
TESTING ARRANGEMENT FOR ELECTRICITY METERS WHILE IN A POWERLINE CIRCUIT BY APPLICATION OF A REGULATED LOAD
Richard Friedl, Lamme uber Braunschweig, and Peter Seyfried, Braunschweig, Germany, assignors to Zera Elektrische Prufgerate Cremer & Co., Konigswinter (Rhine), Germany
Filed Feb. 7, 1968, Ser. No. 703,762
Claims priority, application Germany, Feb. 17, 1967, F 51,546
Int. Cl. G01r 11/32
U.S. Cl. 324—74
12 Claims

ABSTRACT OF THE DISCLOSURE

An arrangement for testing electricity meters while they are in their installed positions. A constant load which is independent of line voltage variations is connected to the meter to be tested. A time measuring circuit measures the time interval corresponding to a predetermined number of rotational cycles of the meter. A reference time circuit provides a signal representing a reference time interval derived from the constant load and the physical properties of the meter; the time interval signal derived from the time measuring circuit, and the reference time signal are both applied to a comparator which provides a difference voltage representing the difference between these two applied signals. As a result, the inaccuracy of the meter is established while located in its normal operating position. The constant load is derived from transistors and resistors connected in series therewith. Limit indicator circuits are included to indicate when the line voltage is outside of prescribed limits. A field-effect transistor is used in the voltage divider for regulating the power applied to the constant load.

BACKGROUND OF THE INVENTION

The testing of conventional electricity meters is accomplished in specially designated testing laboratories. In these laboratories the meters are separated from their operating power circuits and an apparent or equivalent power is applied to them. The conventional procedure requires that, for testing purposes, the meter be disconnected and removed from the power line network and taken to the laboratories. For purposes of controlling the meters at their locations of installation, industrial developments have provided for portable testing apparatuses. These apparatuses operate in conjunction with comparison meters. These portable testing apparatuses are, however, relatively heavy and complex to operate. Furthermore, they require a switching arrangement for switching the testing equipment to the testing connectors or terminals. Because the system operates on the comparison principle, relatively long time intervals are required to carry out the tests. As a result, it has been found that it is simpler and more economical to remove the meter from its installed location and to transport it to a testing station.

In contrast to the conventional procedures, the present invention permits the meter to be tested while it is at its installed location, through relatively short testing time intervals. The testing period with the present invention is similar to that used in time-power processes having voltage stabilizers for the testing voltages and currents, and generally applied in testing laboratories. In accordance with the present invention, the meter does not have applied to it an equivalent power. Instead, the applied power is defined through resistors. A particular novel feature of the present invention for testing electricity meters while installed in their normal operating lines, resides in the condition that the meter to be tested has applied to it a load which is independent of line voltage fluctuations. Thus, a constant load apparatus is used with a constant and well-defined power input level. This constant load apparatus is portable and relatively light to carry. For a particular variation in the measuring time the latter is compared with a computed time interval derived from the load and the meter characteristics, for the purpose of determining the prevailing error or inaccuracy.

In accordance with the present invention, meters may be tested within a few minutes and with relative precision while they are in their normal installed positions. By applying the procedure in accordance with the present invention, it is necessary to remove from installation only those meters in which the errors or inaccuracies exceed predetermined limits. It is the common practice in Germany to periodically exchange meters that are installed even though they exhibit proper operating characteristics (which is the case of approximately 96% of the meters).

SUMMARY OF THE INVENTION

An arrangement for testing electricity meters while they are installed in their normal operating positions. To test the meter, a constant load is applied to the meter. This load is independent of line voltage fluctuations or variations. A time measuring circuit connected to the meter measures the time interval corresponding to a predetermined number of rotational cycles of the meter. A reference time circuit provides a reference time interval which is derived from the constant load and takes into account the physical properties of the meter. A comparator has as its inputs the measured time interval and the reference time interval for purposes of comparing the two and obtaining a difference signal. This difference signal realized from the comparator represents the error or inaccuracy of the meter. Limit indicators may be included so as to indicate whether the voltage of the line is within prescribed limits. The constant load used in the testing procedure may, furthermore, be comprised of resistors and transistors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
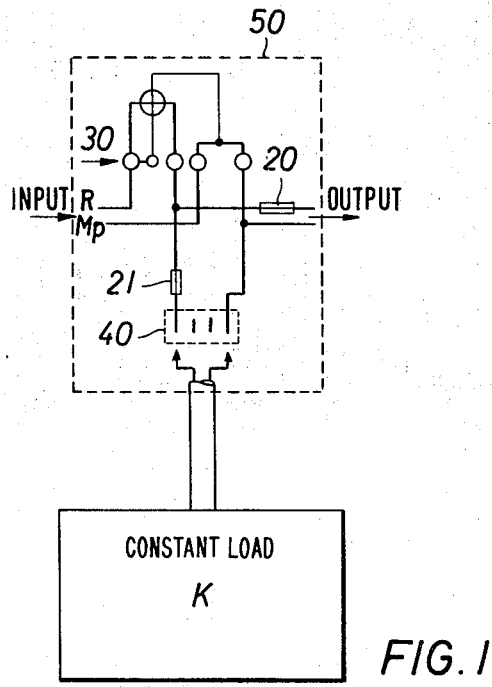
FIG. 1 is a schematic block diagram showing the arrangement for testing an electricity meter, while it is installed, on a single phase line, in accordance with the present invention.

Referring to the drawing and, in particular, to FIG. 1, a constant load K is used for the purpose of testing a single-phase electric power meter while connected to the lines from which power is fed. Since assurance cannot always be had that the constant load K is the only load for the meter in the power circuit, this constant load apparatus K should be connectable directly behind the meter. For this purpose, the meter itself or the meter board should preferably be provided with testing terminals or contacts. These testing terminals or contacts are to be separable so that while performing the testing operation, the actual consumer power circuit can be disconnected through the fuses or circuit breakers. Testing terminals or contacts which are not safely isolated, should be made unaccessible through a sealed cover.

Figure 2:
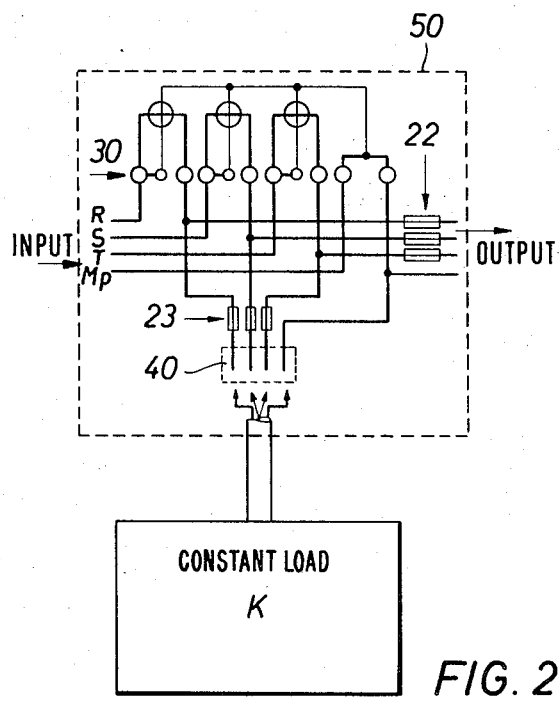
FIG. 2 is a schematic block diagram showing the arrangement whereby an electricity meter is tested when installed on a four-line power supply, in accordance with the present invention.

The application of a constant load apparatus K for the purpose of testing a polyphase meter associated with a four-line power circuit is shown in FIG. 2. Good control of the meter is obtained when the individual driving mechanisms of the meter are single-phase loaded. Accordingly, a single-phase constant load apparatus K is also applicable for the purpose of testing this type of meter. The individual driving mechanisms are thereby tested in sequence by switching the constant load apparatus from one phase to the other.

The constant load apparatus may be designed so that both a practically pure operating power line as well as a definite apparent powerline may be applied to its input.

Thus, in FIGS. 1 and 2, the power meter 50 is provided with testing terminals or contacts 40 to which the load K is applied. Through means of the internal contacts 30, the power input to the meter is channeled to both the output of the meter as well as the testing terminals 40. By properly inserting or removing the fuses 20 and 21 for FIG. 1, and 22 and 23 for FIG. 2, it is possible to disconnect the output load when the constant load K is applied for testing purposes. The fuses 20-23 may, of course, be also constructed in the form of circuit breakers.

Figure 3:
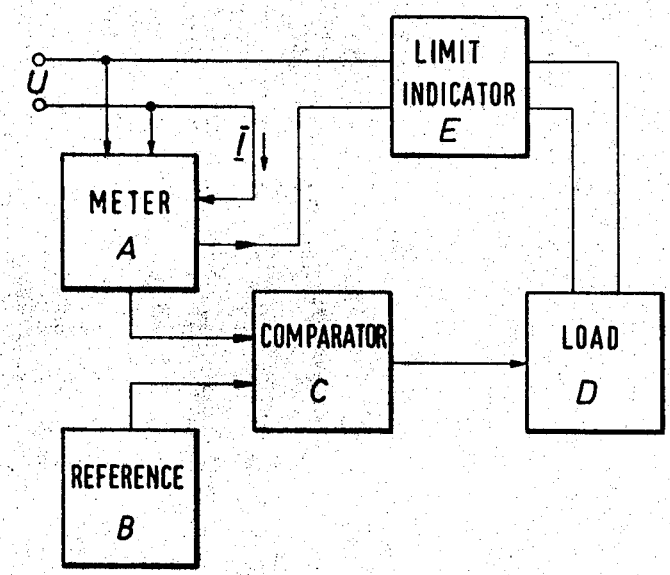
FIG. 3 is a functional block diagram and shows the interrelationships of the circuit elements constituting the testing arrangement of FIGS. 1 and 2.

The design of a constant load apparatus is shown, in block form, in FIG. 3. The metering or sensing element A is connected to the powerlines U so that the voltage and the current I are applied to the metering element. The output of the metering element A is applied to a difference amplifier C and compared therein with a signal derived from a reference input B. The difference amplifier C is properly loaded through the load D. An auxiliary arrangement E may be used for the purpose of indicating the limiting values with respect to the line voltage, line current, line power, and the measuring time.

The metering or sensing element A may be designed in the form of Hall multipliers, multiplying stages having field-dependent resistors, thermal elements, or multipliers based on the two-parabola principle.

Figure 4:
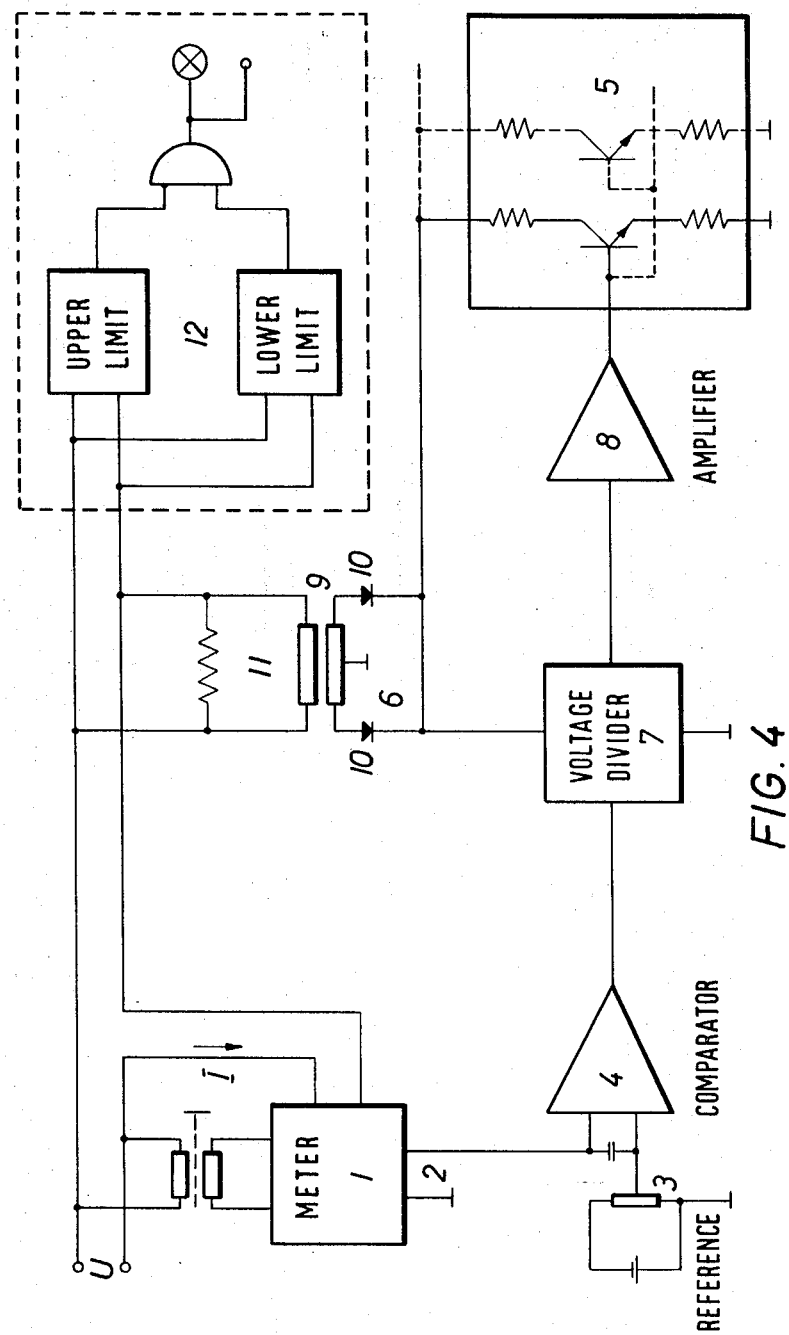
FIG. 4 is a functional schematic diagram and shows the construction of the elements enumerated in FIG. 3.

The embodiment of an arrangement which is independent of variations in the voltage of the powerlines, is shown in FIG. 4. The input voltage U and input current I are applied to a multiplying stage 1. At the output 2 of this multiplying stage 1, appears a signal voltage which is proportional to the product of the quantities U and I. The average value of this voltage representing its D.C. component, is a measure of the transmitted power $UI \cos \phi$. The signal voltage 2 is compared with an adjustable reference voltage 3. The difference amplifier 4 amplifies the difference between the signal voltage 2 and the reference voltage 3 and transmits it so that it may be applied to a variable auxiliary load 5. A voltage divider 7 with a field-effect transistor receives the output of the difference amplifier 4. An operational amplifier 8 is connected between the voltage divider 7 and the variable load 5 consisting of resistors and transistors. The operation is such that the voltage divider 7 exerts control, by way of the amplifier 8, over the load 5 so that the load current at all instants proportional to the instantaneous input voltage 6. This is accomplished by turning on or off the proper number of transistors. In accordance with this arrangement, the auxiliary load is practically resistive to the extent that the current taken remains essentially sinusoidal. The input voltage 6 for the variable load is realized through the use of a transformer 9. By inserting a two-branch rectifier 10, polarity reversal of the input voltage 6 is avoided across the variable load. As a result, the use of npn transistors is adequate. By using pairs of complementary transistors (npn and pnp) it is possible to omit the rectifier 10. Weight and economy can be saved by omitting the transformer 9 and using high voltage transistors or a special construction of the load circuit cascading two or more transistors.

Since in the application under consideration, it is necessary to take into account voltage variations of only approximately 10%, the main portion of the required load is eliminated through the basic load 11. For purposes of realizing the desired power factor, this basic load can be constructed of resistive and reactive components. In order to dissipate large amounts of heat, the arrangement can also include a ventilating device or cooling apparatus. By using such a basic load, the variable auxiliary load 5 may be rated for a relative low power consumption.

The arrangement in accordance with the present invention forms a circuit loop in which the applied power is always automatically regulated so that the output voltage signal 2 from the multiplier stage differs by only a small amount from the reference voltage. Accordingly, the output voltage signal 2 corresponds to the desired constant load for the meter testing. By using an amplifier 4 with low drift characteristics, the stability of the arrangement for performing the comparison, is essentially dependent on the characteristics of the multiplier stage. A measuring uncertainty of less than 0.3% is readily attainable in the desired operating region when using conventional multipliers.

The insertion of the circuit 12 in the arrangement of FIG. 4 is used to determine whether the line voltage is within the allowable operating region. Thus, an indication is obtained of whether the line voltage is within ±10% of the desired votlage.

The testing procedure can be further simplified by applying mechanical or electronic indicating instruments or time interval meters which are manually or photoelectrically actuated for starting and stopping purposes. Such instruments are used to operate in conjunction with conventional computer means for determining the error from the measuring time and the meter data.

It will be understood that each of the elements described above, or two or more together, may also find a useful application in other types of electricity meter testing apparatus differing from the types described above.

While the invention has been illustrated and described as embodied in an electricity meter testing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. An arrangement for testing an electric meter connected in a power line circuit comprising, in combination, constant energy consuming load means connected to said meter and being independent of line voltage variations, said load means being automatically self-regulatable to a predetermined value; time measuring means connected to said meter for measuring the time interval corresponding to a predetermined number of rotational cycles of said meter; reference time means for providing a reference time interval derived from said constant load means and the properties of said meter; and comparison means connected to said time measuring means and said reference time means for comparing the measured time interval with said reference time interval, whereby the inaccuracy of said meter is determined while in its installed operating position.

2. The arrangement for testing an electricity meter as defined in claim 1, including signal indicating means connected to said constant load means for providing an indication when the line voltage is outside of a predetermined limit.

3. The arrangement for testing an electricity meter as defined in claim 1, including recording means for recording the time interval measured by said time measuring means.

4. The arrangement for testing an electricity meter as defined in claim 1, including computing means for deriving the inaccuracy of said power meter from said time interval measured by said time measuring means and the physical properties of said meter.

5. The arrangement for testing an electricity meter as defined in claim 1, including means for testing a power meter adapted to a three-phase A.C. power line.

6. The arrangement for testing an electricity meter as defined in claim 1, including connecting contact means for connecting said constant load means to said power meter.

7. The arrangement for testing an electricity meter as defined in claim 6, including means for protecting said connecting contact means against excessive currents.

8. An arrangement for testing an electric meter connected in a power line circuit comprising, in combination, constant load means connected to said meter and being independent of line voltage variations; time measuring means connected to said meter for measuring the time interval corresponding to a predetermined number of rotational cycles of said meter; reference time means for providing a reference time interval derived from said constant load means and the properties of said meter; comparison means connected to said time measuring means and said reference time means for comparing the measured time interval with said reference time interval, whereby the inaccuracy of said meter is determined while in its installed operating position; voltage measuring means in said constant load means for measuring a voltage associated with said constant load means and providing a corresponding proportional voltage, said reference time means providing a reference voltage for comparing with said corresponding proportional voltage by said comparison means; and regulating means connected to the output of said comparison means and regulating the power applied to said constant load means as a function of the output of said comparison means representing the difference between the corresponding proportional voltage and said reference voltage.

9. The arrangement for testing an electricity meter as defined in claim 8, wherein said regulating means includes field-effect transistors.

10. The arrangement for testing an electricity meter as defined in claim 8, wherein said regulating means comprises electronic circuit elements.

11. The arrangement for testing an electricity meter as defined in claim 8, wherein said regulating means is a voltage divider.

12. The arrangement for testing an electricity meter as defined in claim 11, including a field-effect transistor within said voltage divider means.

References Cited

Proceedings of IEE, "Recent Development in Comparative Methods of Testing A.C. Electricity Meters" (S. F. Musson et al.), vol. 97, part II, No. 56, April 1950, pp. 97–107.

RUDOLPH V. ROLINEC, Primary Examiner

E. L. STOLARUN, Assistant Examiner